Tadashi ARAKI
Kiro ASANO
Hitoshi TAKITA
Takao AWAO 3,718,574
METHOD FOR HEAVYING POLYCYCLIC
SUBSTANCES
Tadashi Araki, Kiro Asano, Hitoshi Takita, and Takao
Awao, Tokyo-to, Japan, assignors to Kureha Kagaku
Kogyo Kabushiki Kaisha, Chuo-ku, Tokyo-to, Japan
Filed Dec. 28, 1970, Ser. No. 101,510
Claims priority, application Japan, Dec. 29, 1969,
45/105,232
Int. Cl. C10c 3/02
U.S. Cl. 208—44          5 Claims

ABSTRACT OF THE DISCLOSURE

Method for heavying polycyclic substance, wherein the crude material is treated with an oxidizing agent, and then treated with ammonia or amines.

BACKGROUND OF THE INVENTION

This invention relates to a method of heavying organic compounds containing polycyclic condensation structure as the principal constituent.

Heretofore, there have been known many expedients for heavying tars and pitches of coal or petroleum type, e.g., extraction, distillation, heat-treatment, oxidation-treatment with gas such as air, or oxidation-treatment with liquid such as nitric acid, aqueous solution of hypochlorous acid, etc.

Of these, extraction and distillation are to retain high-molecular-weight components by simply removing components of relatively low molecular weight from those constituting the tars and pitches, the treatments of which cannot be called "heavying" of the substance in the true sense of the word. Furthermore, with such methods, the rate of yield of the resultant heavy substance with respect to the starting material would inevitably be extremely small.

The method of heavying tars and pitches by means of the heat-treatment is based mainly on polycondensation of the substances due to cutting of the side chains in the molecules, hence it is difficult to proceed smoothly unless the treatment temperature is relatively high, e.g., above 400° C. For this reason, addition of Friedel-Krafts type catalyst has been resorted to very often as an effective expedient.

Heavying of tars and pitches by oxidation-treatment is considered to take place by that oxygen is introduced into molecules of the crude material as it is or in the form of a functional group containing oxygen, where it is combined with hydrogen and carbon atoms to form water ($H_2O$), carbon dioxide ($CO_2$), and/or carbon monoxide (CO) and dissociate from the material, at which time matrices of different molecules in the substance are combined together to become heavy. In case oxygen constitutes molecules such as $CO_2$, CO, etc., there often takes place a phenomenon such that it combines with carbon atoms in the matrix. In other words, carbon atoms in the matrix are pulled out with the consequent destruction of the matrix constitution. This would inevitably bring about various unfavorable effects on the material and product produced thereby such that not only weight of the substance reduces besides dissipation of the low-molecular-weight components, but also the inherent characteristics of the crude material is impaired by the destruction of the matrix structure, and that crystallinity of carbon molecule in the carbon articles obtained from this heavy substance as the material is impaired.

SUMMARY OF INVENTION

It is therefore the primary object of the present invention to provide an improved method of heavying tars, pitches and other resinous substances without spoiling the matrix structure which is the principal constituent of the crude material.

It is another object of the present invention to provide a method of heavying those hydrocarbon compounds with a polycyclic condensation structure as the principal constituent, wherein the substance is subjected to an oxidizing treatment with an oxidizing agent in gaseous or liquid form, thereafter it is further treated with ammonia or amines.

The foregoing objects and other objects as well as the principle and operation of the present invention will become more apparent from the following detailed description and a few preferred examples of the present invention when read in conjunction with the accompanying drawing.

DETAILED DESCRIPTION OF THE INVENTION

Figure 1:
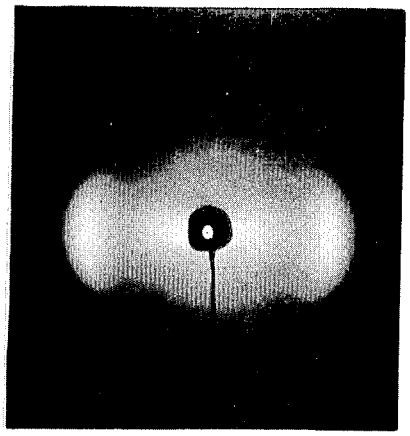
FIG. 1 is an X-ray microphotograph of a carbon article obtained from the material treated by the method according to the present invention.

The invention will now be described hereinbelow, in sequence, with respect to the class of crude materials to be treated, actual treatment steps, effects to be resulted from the present invention is comparison with the known arts.

The term "heavying" used in the present invention is meant by that molecules of the components in the substance to be treated cause polymerization or condensation to increase molecular weight thereof, whereby various phenomena such as infusibilization, increase in boiling point, increase in melting point, and so forth appear in the resultant substance.

The crude materials, to which the present invention is directed are those hydrocarbon compounds containing as the principal component thereof a polycyclic condensation structure (preferably having aromaticity having more than two rings with or without alkyl radical attached thereto. These compounds may be used individually or in the form of a mixture of some of them. They may also be used in any form such as powder, liquid, or even in shaped article like fiber, film, rod, etc.

Examples of these hydrocarbon compounds are: aromatic or aliphatic hydrocarbons and their alkyl-derivatives such as naphthalene, tetraline, decaline, indene, acenaphthene, pyrene, crisene, naphthacene, perylene, triphenylene, etc.; distilled component of petroleum of 200° C. and above; by-products in the petroleum refining industries such as heavy oil, and pitches (e.g., visbreaker residual oil, cyclic oil from contact-cracking, asphalt, coker distillate oil, de-alkylated residual oil, etc.); oily or solid substance produced at the time of petroleum cracking in the petro-chemical industries where ethylene, acetylene, propylene, etc. are produced; and oily and pitchy substances obtained in the coal distillation industries. These substances generally possess the $H/C$ atomic ratio of 0.4 to 1.2.

The first step of subjecting these substances to the oxidizing treatment as mentioned above is arbitrarily selected from the conventional oxidizing reactions. Examples of these known oxidizing treatments are: (1) treatment with one kind of gas or a mixture of more than two kinds of gases such as ozone, oxygen, air, halogens, $SO_3$, oxides of nitrogen, and so forth; and (2) treatment with solution of nitric acid, sulfuric acid, nitrous acid, dichromate, permanganate, or the like. Any other oxidizing treatment may also be put into practice effectively.

The treatment temperature is generally in the range of from 0° C. to 400° C. More generally, there may be adapted such a condition that no remarkable consumption of the substance to be treated nor destruction of the matrix molecules due to the oxidation takes place, and yet sufficient effect of oxidation may be exhibited.

It has been verified by physical method such as infrared ray spectrum as well as by chemical assays that, by the abovementioned oxidizing treatment, at least one kind of a substituent radicals such as $>C=O$ (quinone, ketone, aldehyde, carboxylic and like other types), —OH (phenol, alcohol, carbonic acid, and like other types), —$NO_2$, =NOH, —$CH_2X$ (X is a halogen), —$CX_3$,

etc. is introduced into the crude material.

Upon completion of the oxidizing treatment, the crude material may be, depending on necessity, molded into a shaped body for the subsequent treatment with ammonia or amines.

The second step of treatment with ammonia or amines will now be explained hereinbelow.

Ammonia may be advantageously used in gaseous form such as, for example, pure ammonia gas or a mixture of ammonia and air or an inactive gas such as nitrogen. It is worthy of note to mention that use of ammonia in the form of mixture with air is to carry out concurrently the oxidation treatment due to oxygen contained in air and the ammonia treatment. Same can be said of a mixture of ammonia and air containing ozone. It has been verified by the present inventors that, in the case of using a mixture of ammonia and air, there first takes place introduction into the crude material of the abovementioned functional group by the action of the oxidizing agent, and then the reaction due to ammonia. From this finding, it should be correctly understood that, while the reaction takes place in one step, at a glance, it actually involves two-step reaction. Such case also falls under the category of the present invention except for a case, wherein an oxidizing agent and ammonia or amines mutually react to produce an entirely different compound, e.g., $NO_2$ gas and ammonia which react to produce ammonium nitrite, and nitric acid and ammonia to form an ammonium salt to exhibit no effect at all.

Amines to be used are: primary amines such as methyl amine, ethyl amine, butyl amine, aniline, etc.; secondary amines such as dimethyl amine, diethyl amine, dibutyl amine, diphenyl amine, etc.; polyamines such as piperidine, ethylenediamine, diethylene triamine, triethylene tetramine, benzidine, p-p'-diamino-diphenyl ether, etc.; and a substance like the crude material to be used in the present invention, into which more than one number of amino group is introduced. These amines may also be used in the form of gas, liquid, or a mixture powder thereof.

The temperature for the treatment with ammonia or amines, in general, ranges from a room temperature to 400° C. or so. The treatment time is governed by the treatment temperature.

The crude material which has been made heavy by the aforedescribed two-step treatment possesses various effects as mentioned hereinbelow.

(1) High carbon yield: According to the present method, substantially all of carbon atoms in the substance to be treated remain in the product which has been made heavy, i.e., the least carbon atom escapes therefrom. The reason for this is yet to be clarified, but the following assumption is possible. Most of the functional groups containing oxygen or halogen and introduced into the crude material at the first step of the treatment are substituted for a functional group containing nitrogen atom due to isolation of water or halogenated hydrogen from the substance at the second stage of the reaction, or is combined with other matrix molecule by the help of the nitrogen-containing functional group. When the crude material is further heated, the nitrogen-containing functional group pulls off hydrogen within the molecule or from the molecular chains to isolate hydrogen in the form of $H_2O$, $N_2$, or $NH_3$ and, at the same time, causes the matrix molecules to directly combine each other.

In the abovementioned reaction mechanism, those which dissociate are always compounds of hydrogen and other atoms contained in the functional groups which have already been introduced into the crude substance at both first and second reactions such as, for example, $H_2O$, HX, $N_2$, $NH_3$, etc., whereby heavying of the crude substance and dehydrogenation can be carried out effectively. In this case, as the carbon atom dissociates from the substance to an extremely small degree, the rate of carbon yield (content of carbon atom in percent by weight remaining in the product rendered heavy) becomes remarkably high. Thus, the least dissociation of carbon atoms from the substance endorses that no destruction of the matrix structure accrues from the treatment, and, in addition, it is really surprising to note that tars and pitches of the coal and petroleum types have been possibly rendered heavy or infusibilized with high rate of carbon yield, the industrial significance of which is great.

(2) No catalyst required: It has been the practice to often use metallic salts such as $AlCl_3$, $FeCl_3$, and so forth as the Friedel-Krafts type catalyst to render a substance heavy. However, as residue of these catalysts existing in the heavy substance has been in most cases a cause for change in quality of the heavy substance to be stored as time goes on, or brings about deleterious effect at the time of use thereof, it is necessary to remove such residue beforehand, the removing work of which is complicated and costly. The present invention needs not use such catalyst at all in the course of treating the crude material to be rendered heavy, in which respect great advantage of the invention resides, too.

(3) Easiness in regulating the reaction conditions: According to the present invention, in still other aspect of its advantage, it is possible to arbitrarily regulate the first and second reactions by proper selection of the reaction conditions. This means that not only the degree of heavying of the substance can be controlled, but also difficulty or easiness of orientation of the component molecules can be controlled.

In general, mechanical as well as physical properties of carbon and graphite materials depends largely on the degree of crystallization in the materials. Organic substances are generally carbonized by heat-treatment in a non-oxidizing atmosphere of 500–1000° C. In this case, aromatization of the substance takes place prior to the carbonization thereby to form a network plane of the polycyclic condensation structure. When a plurality of the network planes are laminated to constitute micro-crystallite, it is called a carbon molecule. Random arrangement of such micro-crystallites is named "amorphous carbon." Further heat-treatment of this organic substance to a temperature in the vicinity of 3,000° C. causes growth of the crystallites and simultaneously increases the degree of the crystal orientation. The degree of the crystal growth at this time differs naturally from one crude material to another, and also varies to a great extent depending on the treatment conditions. That is, in order for the network planes consisting of polycyclic aromatic condensation structure to be laminated, the crude substance should preferably be rich in aromatic components. In the course of the carbonization, when the crude substance undergoes very complicated heavying processes which prevent the network planes from growing and laminating (i.e., three-dimensional polymerization), crystallinity of the substance is hindered to result in carbon material having difficult degree of graphitizability which is generally called a hard carbon material. On the contrary, a carbon material having easy degree of graphitizability is called a soft carbon material.

According to the findings heretofore made based on various experiments, a most general expedient of producing the hard carbon material is to subject the crude substance to the oxidizing treatment at a relatively low temperature of less than 300° C. By this low temperature oxidation, there are formed very complex three-dimensional bridging connections among the carbon molecules with the consequence that crystal growth of the carbon molecules in the course of the carbonization process is remarkably hindered. If there exists a functional group containing oxygen, the oxygen not only forms water at the time of thermal decomposition, causing dehydrogenation, but also combines with carbon to form carbon dioxide, and carbon monoxide, and dissociates from the substance. At this time, the rate of carbon yield is reduced and simultaneously the ring structure of the matrix molecules is destroyed, which also become the cause for deterioration in crystallinity of carbon molecules.

In the present invention, the crude material to be treated does not necessarily become the hard carbon material, even when a functional group containing oxygen is introduced thereinto by the first step reaction, but it is rather turned into the soft carbon material of easy graphitizability in some cases. The reason for this may be that, since most part of the functional group introduced into the crude material at the first step reaction is replaced with a functional group containing nitrogen at the second step reaction, there takes place no hindrance against the crystal growth. Although it might be a real wonder why the nitrogen-containing functional group does not hinder the crystal growth, this regulability of the crystal growth may be said to be one of the unique features of the present invention.

As has been made apparent from the foregoing description, the present invention is too provide a novel method of heavying organic compounds containing polycyclic aromatic condensation structure as its principal constituent, in which various crude materials in either form of solution, liquid, solid, etc. may be effectively rendered into heavy substance as desired. The method itself may find its application in the field of manufacturing a binding material for carbonaceous or ceramics articles, and is also effectively applicable in producing carbonaceous articles themselves. For example, fibers or films made of aromatic pitch material obtained from heat-cracking of petroleum or thermal decomposition of coal tar may be easily rendered heavy and infusible by the present method with the result that they can be processed into carbon fibers and films with remarkably high carbonization yield and without causing deformation in the articles due to the high temperature carbonization treatment. Furthermore, unlike the case of heavying the material by the conventional oxidation treatment alone, as there takes place no hindrance against the crystal growth, an extremely easy graphitizable article may be obtained by making good use of the structural characteristic of the crude material. Since the carbon fibers and the like are strongly required from all concerned to have high degree of graphitizability, elasticity as well as mechanical strength, the effect obtained from the present invention is considered outstanding.

It is further possible to obtain carbonized or graphitized articles without losing its original shapes thereof from a pitch powder which is molded into a required shape and rendered heavy in accordance with the present invention. As the method of shaping in this case, both powder forming method and slurry casting method may be utilized.

Even in the case of using cokes, graphitic aggregate, or refractory aggregate together with the crude material to be treated in accordance with the present invention as a binder, the present method exhibits excellent infusibilization effect, whereby shaped carbon articles of the least porosity and high tenacity may be produced with a high rate of carbonization. As the impregnation treatment after roasting becomes dispensable in this case, economy in manufacture is greatly improved.

It may be emphatically repeated that, in the above-described shaping method in common, the crude material may first be oxidation-treated, after which it is shaped into an article, and then the shaped article is subjected to the second treatment with ammonia or amines.

The present invention is also advantageously used in the case of manufacturing electrodes, commutators, and sliding material which require high degree of graphitizability, or carbon articles for a certain kind of machinery requiring high mechanical strength.

Thus the present invention has brought into the field of carbon and ceramic industries a new method of heavying the crude substances, by which production of carbon and ceramic articles of highly improved properties has been made possible.

PREFERRED EMBODIMENTS

In order to enable persons skilled in the art to reduce the invention into practice, the following examples are presented. It should, however, be noted that these examples are illustrative only and they do not intend to limit the scope of the present invention.

EXAMPLE 1

Crude oil of Seria origin was preheated to 500° C., and then atomized into steam heated to 2,000° C. to mix therewith. The crude oil was pyrolized (reaction temperature of approximately 1,200° C.) to result in a tarry substance at a rate of recovery of about 30%. This tarry substance was distilled under a reduced pressure of 5 mm. Hg to divide it into a distillate component (hereinafter referred to as A) of 300° C. or below and a residue (hereinafter referred to as B) of nearly same amount as the former.

As the results of various measurements on the A substance by way of nuclear magnetic resonance (N.M.R.) spectrum, infrared ray spectrum, elementary analysis, gas chromatography, molecular weight, etc., it was found that this substance was a liquid composed of a mixture of various kinds of molecules representable by a model, in which a small number of short chain alkyl radicals are coupled with a polycyclic aromatic condensation structure having 2 to 4 aromatic rings as the main skeleton.

This substance was first contacted with air containing 40% by weight of $NO_2$ at a temperature of 120° C. for a time period of 60 minutes and 120 minutes, respectively, and then contacted with ammonia gas at 250° C. for 30 minutes, whereupon pitch having a softening point of 70° C. and 380° C., respectively was obtained at a rate of recovery of 90% with respect to the A substance. The pitch having the softening point of 70° C. is designated as "pitch C", and that having the softening point of 380° C. is designated as "pitch D".

The major properties of the above pitches C and D as measured are shown in the following Table 1, from which it is recognized that the substance was effectively made heavy.

TABLE 1

| Properties | Crude raw material A (in liquid) | Pitch C | Pitch D |
|---|---|---|---|
| Mean molecular weight | [1] 200 | [2] | [2] |
| Carbon content (wt. percent) | 92.24 | 92.90 | 92.05 |
| Hydrogen content (wt. percent) | 7.00 | 4.31 | 3.62 |
| Oxygen content (wt. percent) | | 1.28 | 2.01 |
| Nitrogen content (wt. percent) | | 1.40 | 2.20 |
| Rate of carbonization [3] (wt. percent) | >5 | 74 | 88 |
| Carbonization yield (percent) | >5 | 80 | 90 |
| H/C atomic ratio | 0.98 | 0.55 | 0.48 |

[1] Approximate.
[2] Measurement impossible due to existence of insoluble components.
[3] "Rate of Carbonization" herein used is the quantity in percent by weight of the residual carbonized material, when a specimen is placed in a crucible and heated to a temperature of 1,000° C. at a temperature rise rate of 5° C. per minute in nitrogen atmosphere.

The pitch C thus obtained was added to doromite clinker or magnesia clinker at a rate of 6% by weight, and kneaded for 30 minutes at 100° C., after which the kneaded material was shaped into a mold under pressure of 500 kg./cm.$^3$ to obtain a short column having dimensions 50 x 50 x 80 mm. The compression strength of this column measured at a normal temperature indicated 79 kg./cm.$^2$. In contrast to this, the compression strength of a column of the same dimension obtained from coal tar pitch having the softening point of approximately 80° C. in the same manner as mentioned above was no higher than 60 kg./cm.$^2$. This fact signifies that shaped articles of the heavy pitch according to the present invention has higher compression strength in their raw state than that of the ordinary pitch, so that they provide good workability in various manufacturing processes, hence remarkable contribution to productivity.

From the pitch D, slurry was prepared by mixing and kneading 25 g. of the pitch material, 20 g. of ethyl alcohol, and 100 g. of water in a ceramic ball mill for laboratory experiment of a 1-liter capacity for 8 hours at a room temperature. The slurry was shaped into a small crucible having wall thickness of about 3 mm. by pouring it in a plaster mold in a molding time of 5 seconds. The shaped article was first dried at a room temperature, thereafter it was further dried at a temperature of 100° C. Upon completion of the drying, the shaped article was subjected to carbonization treatment in a nitrogen atmosphere by elevating a temperature to 1,400° C. at a temperature rise rate of 2° C. per minute up to 220° C., and 5° per minute thereafter. The reduction in diameter of the crucible in the course of the carbonization treatment was approximately 10%. The resulted carbonized crucible possessed porosity of 8.5% and bulk density of 1.57.

EXAMPLE 2

The residual substance B resulted from the distillation under reduced presure as explained in Example 1 above was found to be a pitch having a melting point of about 200° C. and composed of a mixture of various compounds with a polycyclic aromatic condensation structure having more than 4 aromatic ring in average as the matrix, as the results of various measurements by way of nuclear magnetic resonance (N.M.R.) spectrum, infrared ray spectrum, elementary analysis, gas chromatography, molecular weight, etc. The major properties of the pitch B as measured are as follows.

TABLE 2

| Properties: | Pitch B |
|---|---|
| Mean molecular weight, approx. | 600 |
| Carbon content (wt. percent) | 95.88 |
| Hydrogen content (wt. percent) | 4.01 |
| Sulphur content (wt. percent) | 0.08 |
| H/C atomic ratio | 0.5 |

This pitch B was carbonized in nitrogen gas by being heated to 1,000° C., thereafter it was further heated to 2,400° C. in argon gas to be graphitized. On conducting an ordinary X-ray measurement, the product was recognized to be a soft carbon material of excellent graphitizability having the value of the graphite crystal spacing Co of 6.765 angstroms as determined from the crystallographic plane index $d_{(002)}$.

The pitch material was spun into pitch fibers of 10 microns in average diameter by means of a centrifugal spinning machine having a rotary cylinder of 150 mm. in diameter and 30 mm. in depth and provided with 120 nozzles of 0.7 mm. in diameter each, and under the spinning rate of 2,000 m./min. and the stretch ratio of 5,000 at a temperature of 300 to 330° C.

The fibers were divided into two bundles, one of which was heat-treated in air containing 30% by volume of ammonia gas starting from a room temperature up to 300° C. at a temperature rise rate of 1° C. per minute so as to be made heavy and infusible (hereinafter referred to as "No. 1 batch"), and the other of which was also heat-treated in air alone starting from a room temperature up to 300° C. at a temperature rise rate of 1° C. per minute so as to be made heavy and infusible (hereinafter referred to as "No. 2 batch"). Subsequently, both batches were heated in a nitrogen gas atmosphere up to 650° C. at a rate of 5° C./min., at which temperature a stress of 0.4 t./cm.$^2$ was imparted by using a weight to the batches, while continuing heat-treatment up to a temperature of 850° C., thereafter the fibers were further heat-treated up to 1,600° C. at a rate of 20° C./min. without imparting load. Further graphitization treatment was conducted in argon gas by elevating temperature up to 2,400° C. at a rise rate of 20° C./min., while imparting stress of 1.2 ton/cm.$^2$ to the fibers.

The graphite fibers thus obtained possessed tensile strength of 17 tons/cm.$^3$ in No. 1 batch and 14 tons/cm.$^2$ in No. 2 batch, and Young's modulus of 3,300 tons/cm.$^2$ and 2,800 tons/cm.$^2$, respectively. Through an X-ray observation, it was verified that the network plane oriented within the range of ±10 degrees from the axial direction of the fibers was 91% in the case of No. 1 batch and 85% in the case of No. 2 batch, the former being superior to the latter.

EXAMPLE 3

A pitchy substance obtained from heat-treatment of tetrabenzo-(a,c,h,j)-phenazine in a nitrogen atmosphere at 580° C. for 60 minutes was determined as a result of analyses to be a mixture of aromatic substances having large polycyclic condensation structure which is presumed to have been formed by condensation of tetrabenzo-(a,c,h,j)-phenazine due to dehydrogenation of 2 to 4 hydrogen atoms. The pitchy substance had its softening point of about 300° C.

This pitch was melt-spung into pitch fibers of 10 to 12 microns in diameter by extrusion method utilizing a spinning machine having five nozzles of 0.5 mm. in diameter each and at a spinning rate of 100 to 150 m./min. at a temperature range of from 370 to 380° C.

The thus obtained pitch fibers were heat-treated in air containing 20% by volume of $NO_2$ gas at 200° C. for 30 min. Upon completion of the heat-treatment, the fibers were divided into two bundles, one of which was subjected to further heat-treatment in methylamine gas at 200° C. for 30 minutes. By this subsequent treatment, the fibers were recognized to have been made heavy to such an extent that no softening phenomenon takes place at all.

When the treated fibers were carbonized in a nitrogen gas atmosphere by raising temperature up to 1,000° C. at a rise rate of 5° C./min., carbon fibers of excellent orientation was obtained as shown in the X-ray micrograph of FIG. 1. The degree of orientation was recognized to be 83% from analytical strength, and the fact that the carbon fiber of such favorable orientation was obtained by the heat-treatment at 1,000° C. is the characteristic point of the present invention.

Figure 2:
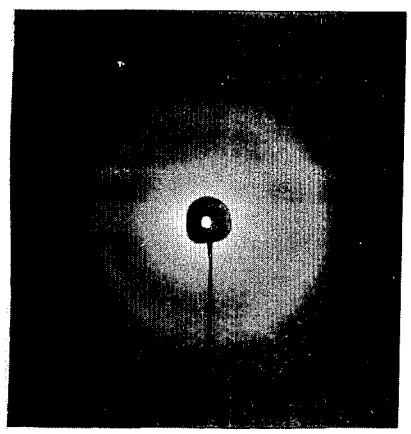
FIG. 2 is another X-ray microphotograph of a carbon article obtained from the material treated by the conventional method.

The other bundle of the divided pitch fibers was further heat-treated in air containing 20% by volume of $NO_2$ at 200° C. for 60 minutes, but no treatment with methylamine, and then carbonized in a nitrogen gas atmosphere by raising temperature up to 1,000° C. at a rise rate of 5° C./min. The resulted carbon fibers were of amorphous structure as seen from FIG. 2.

EXAMPLE 4

From various analyses, it was verified that coal tar pitch having softening point of about 80° C. possessed a mean molecular weight of 400 and below, and was composed of a mixture of various compounds having some numbers of aliphatic side chains with a polycyclic aromatic condensation structure having more than 3 aromatic rings as the principal constituent.

When 300 g. of this coal tar pitch was kneaded in a laboratory kneader of a small size at a temperature of from 100 to 130° C. for 30 minutes, while blowing air containing 30% by volume of $NO_2$ gas thereinto, and then the resultant product was observed through infrared ray spectrum, it was found that radicals such as >C=O, —NO₂, etc. were introduced into the pitch.

The thus oxidized pitch was divided into two batches, one of which was heat-treated for 5 minutes in ammonia gas at 200° C., when the softening point thereof became approximately 400° C., and the other of which was treated for air-oxidation at 200° C. for 30 minutes, the softening point thereof having been about 360° C.

These heavy pitches were pulverized in a ball mill for five hours to obtain fine pitch powder of 200 meshes and below. The pitch powder was then molded into discs of 10 mm. thick and 30 mm. in diameter by compression molding under pressure of 400 kg./cm.²

The discs were heated to a temperature of 2,800° C. at a rise rate of 1° C./min. in a nitrogen atmosphere. The discs treated with ammonia gas at the stage of the raw material was found to have 9.5% of porosity, 98 of Shore hardness (Hs), 630 kg./cm.² of bending strength, 3.37 angstroms of the network plane interval determined by the X-ray diffraction, and graphitizability of medium degree. Whereas, the discs treated for air-oxidation, but no ammonia gas treatment, was found to have 3.39 angstroms of the network plane interval determined by the X-ray diffraction, and graphitizability of difficult degree. The mechanical properties of these discs could not be measured accurately due to the deformation caused to some extent by generation of air voids within the discs in the course of the temperature elevation.

What we claim is:

1. A method for the production of pitch having an increased carbon yield, which comprises the steps of first reacting a raw material which is a pitch composed primarily of a condensed polycyclic aromatic compound, or a mixture of such compounds, having more than two rings with or without an alkyl side chain attached thereto with an oxidizing agent at a temperature of from 0° C. to 400° C., and subsequently treating the oxidized material with a substance selected from the group consisting of ammonia, amines, and a mixture of ammonia and nitrogen at a temperature of from room temperature to 400° C.

2. The method as defined in claim 1, in which the raw material is reacted with a mixture of ammonia gas and an oxidizing agent selected from the group consisting of air, oxygen, and ozone.

3. The method as defined in claim 1, in which the amine to be used in the second treatment is selected from the group consisting of methyl amine, ethyl amine, butyl amine, aniline, dimethylamine, diethyl amine, dibutyl amine, diphenyl amine, piperydine, ethylene diamine, diethylene triamine, triethylene tetramine, benzidine, p-p'-diamino-diphenyl ether, and a substance composed of polycyclic condensation structure having more than two rings with or without alkyl side chains attached thereto, in which at least one amine group is introduced.

4. The method according to claim 1, in which the raw material to be treated is in liquid state.

5. The method according to claim 1, in which the raw material to be treated is in solid state.

References Cited
UNITED STATES PATENTS

| | | | |
|---|---|---|---|
| 2,026,039 | 12/1935 | Hoover | 208—44 |
| 3,493,409 | 2/1970 | Koons | 208—44 |
| 1,868,879 | 7/1932 | Broadhead | 208—44 |
| 2,980,601 | 4/1961 | Meigs | 208—44 |

DELBERT E. GANTZ, Primary Examiner

V. O'KEEFE, Assistant Examiner